(12) United States Patent
Blunier (10) Patent No.: US 11,540,434 B2
(45) Date of Patent: Jan. 3, 2023

(54) CURVED CULTIVATING DISC WITH A STRAIGHT CUTTING EDGE PORTION

(71) Applicant: CNH Industrial America LLC, New Holland, PA (US)

(72) Inventor: Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 391 days.

(21) Appl. No.: 16/653,267

(22) Filed: Oct. 15, 2019

(65) Prior Publication Data

US 2021/0105925 A1 Apr. 15, 2021

(51) Int. Cl.
*A01B 23/06* (2006.01)
*A01B 15/16* (2006.01)
*A01B 7/00* (2006.01)
*A01B 35/28* (2006.01)
*A01B 33/02* (2006.01)
*A01B 9/00* (2006.01)

(52) U.S. Cl.
CPC ............... *A01B 23/06* (2013.01); *A01B 7/00* (2013.01); *A01B 9/003* (2013.01); *A01B 15/16* (2013.01); *A01B 33/024* (2013.01); *A01B 35/28* (2013.01)

(58) Field of Classification Search
CPC ........... A01B 23/06; A01B 7/00; A01B 9/003; A01B 15/16; A01B 33/024; A01B 35/28
See application file for complete search history.

(56) References Cited

U.S. PATENT DOCUMENTS

| 358,246 A | 2/1887 | Arnett |
| 1,158,110 A | 10/1915 | Cook |
| 1,663,239 A | 3/1928 | Bucknam |
| 1,879,193 A | 9/1932 | Graham |
| 3,690,385 A | 9/1972 | Weiss |
| 4,538,688 A | 9/1985 | Szucs |

(Continued)

FOREIGN PATENT DOCUMENTS

| CA | 3036528 A1 * | 10/2019 | ............ A01B 23/06 |
| GB | 832431 A | 4/1960 | |
| WO | WO2002019791 | 3/2002 | |

OTHER PUBLICATIONS

"Smooth Raised Crimp Center Disc Blades," Wearparts Tillage Tools, Dated Apr. 8, 2019 (4 pages) https://wearpartsllc.com/22-x-6-5mm-smooth-raised-crimp-center-disc-blades-dsf136561/.

*Primary Examiner* — Tara Mayo-Pinnock
(74) *Attorney, Agent, or Firm* — Rebecca Henkel; Rickard DeMille (57) ABSTRACT

A cultivating disc for a tillage implement includes an attachment portion positioned at a radial center of the cultivating disc. The attachment portion includes one or more attachment features configured to couple the cultivating disc to the tillage implement about an axis of rotation of the cultivating disc. The attachment portion extends along a first plane perpendicular to the axis of rotation of the cultivating disc. The cultivating disc also includes a cutting edge portion positioned at a distal end of the cultivating disc relative to the axis of rotation. The cutting edge portion extends along a second plane parallel to the first plane. The cultivating disc further includes a curved connecting portion positioned between and connecting the attachment portion to the cutting edge portion. The curved connecting portion further defines one or more radii of curvature.

20 Claims, 8 Drawing Sheets

(56) References Cited

U.S. PATENT DOCUMENTS

| | | |
|---|---|---|
| 4,590,869 A | 5/1986 | Steilen |
| 6,082,276 A * | 7/2000 | Klein et al. ............ A01C 5/064 111/164 |
| 7,143,704 B1 | 12/2006 | Gust |
| 8,899,345 B2 | 12/2014 | Lazcano Lasa |
| 9,107,340 B2 * | 8/2015 | Stark ..................... A01B 15/16 |
| 9,392,737 B2 | 7/2016 | Sanderson |
| 2014/0299343 A1 | 10/2014 | Bruce |

* cited by examiner

CURVED CULTIVATING DISC WITH A STRAIGHT CUTTING EDGE PORTION

FIELD OF THE INVENTION

The present disclosure generally relates to tillage implements and, more particularly, to cultivating discs with a curved connecting portion and a straight cutting edge portion.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as disc blades, configured to penetrate the soil to a particular depth. In this respect, the ground engaging tools may be pivotally coupled to a frame of the tillage implement. Tillage implements may also include biasing elements, such as springs, configured to exert biasing forces on the ground engaging tools. This configuration may allow the ground engaging tools to maintain the particular depth of soil penetration as the agricultural work vehicle pulls the tillage implement through the field. Additionally, this configuration may also permit the ground engaging tools to pivot out of the way of rocks or other impediments in the soil, thereby preventing damage to the ground engaging tools or other components on the implement.

Disc blades may generally include a curved surface in order allow the disc blade to lift and turn soil and residue on a concave side of the disc blade. The curvature of the disc blade may also increase the strength of the disc blade and extend the time between replacement or repair of the disc blades. However, in certain situations, the convex side of the cutting edge may compact the soil which comes into contact with a non-cutting area of the disc blade. Such compaction may reduce the efficiency of the cultivation process, have a negative impact on the agronomic conditions of the soil, and/or increase the load and stress on the disc blades. Such issues may be compounded when the disc blades penetrate the soil vertically or at a shallow angle and thus increase the surface area of the convex side of the cutting edge that contacts the soil.

Accordingly, improved cultivating discs for a tillage implement that reduce soil compaction would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a cultivating disc for a tillage implement. The cultivating disc includes an attachment portion positioned at a radial center of the cultivating disc. The attachment portion includes one or more attachment features configured to couple the cultivating disc to the tillage implement about an axis of rotation of the cultivating disc. The attachment portion extends along a first plane perpendicular to the axis of rotation of the cultivating disc. The cultivating disc also includes a cutting edge portion positioned at a distal end of the cultivating disc relative to the axis of rotation. The cutting edge portion extends along a second plane parallel to the first plane. The cultivating disc further includes a curved connecting portion positioned between and connecting the attachment portion to the cutting edge portion. The curved connecting portion further defines one or more radii of curvature.

In another aspect, the present subject matter is directed to a tillage implement. The tillage implement includes a frame and a plurality of ground engaging tools coupled to the frame. One or more the ground engaging tools are configured as a cultivating disc. The cultivating disc(s) includes an attachment portion positioned at a radial center of the cultivating disc. The attachment portion includes one or more attachments feature configured to couple the cultivating disc to the frame of the tillage implement about an axis of rotation of the cultivating disc. The attachment portion extends along a first plane perpendicular to the axis of rotation of the cultivating disc. The cultivating disc(s) further includes a cutting edge portion positioned at a distal end of the cultivating disc relative to the axis of rotation. Moreover, the cutting edge portion extends along a second plane parallel to the first plane. The cultivating disc(s) also includes a curved connecting portion positioned between and connecting the attachment portion to the cutting edge portion. The curved connecting portion further defines at least one radius of curvature.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to cultivating discs for tillage implements. Specifically, in several embodiments, one or more cultivating discs may include an attachment portion at a radial center of the cultivating disc, a cutting edge portion at an outer edge of the cultivating disc and parallel to the attachment portion, and a curved connecting portion between the attachment portion and the cutting edge portion. In several embodiments, the cutting edge portion parallel to the attachment portion may decrease soil compaction caused by the cultivating disc(s). For instance, such a parallel cutting edge portion may reduce or eliminate the surface area of the cutting edge portion on a convex side of the cultivating disc(s) that contacts the soil. Soil compaction may generally be undesirable during a cultivating operation. Reducing soil compaction may additionally be associated with reducing a backside pressure on the cultivating disc(s) and thus improve the lifespan of the cultivating disc(s). Further, the curved connecting portion may allow the cultivating disc(s) to lift and throw residue and soil broken up by the cutting edge portion. Additionally, the curved connecting portion may increase the strength of the cultivating disc(s) as compared to straight cultivating discs.

Figure 1:
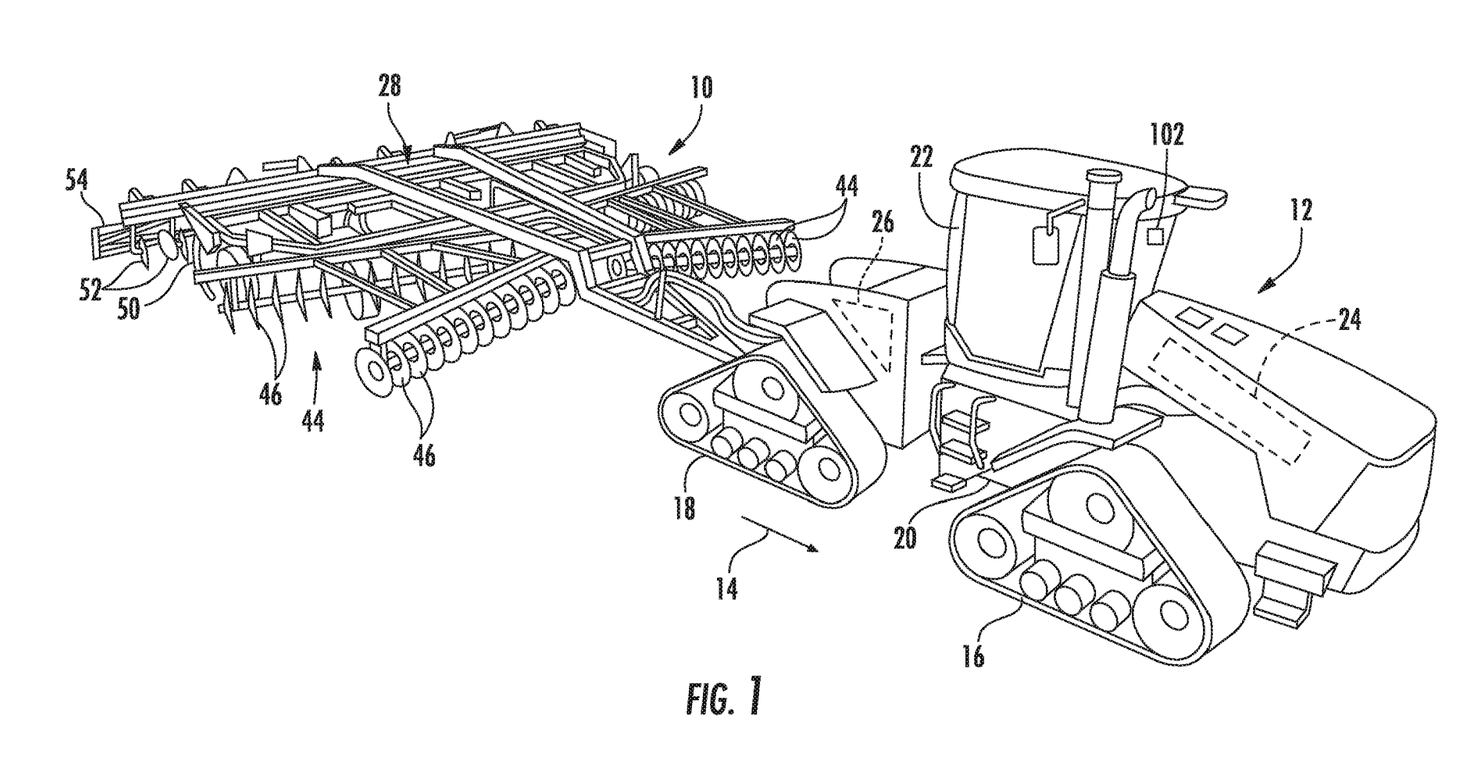
FIG. 1 illustrates a perspective view of one embodiment of a tillage implement in accordance with aspects of the present subject matter.
Figure 2:
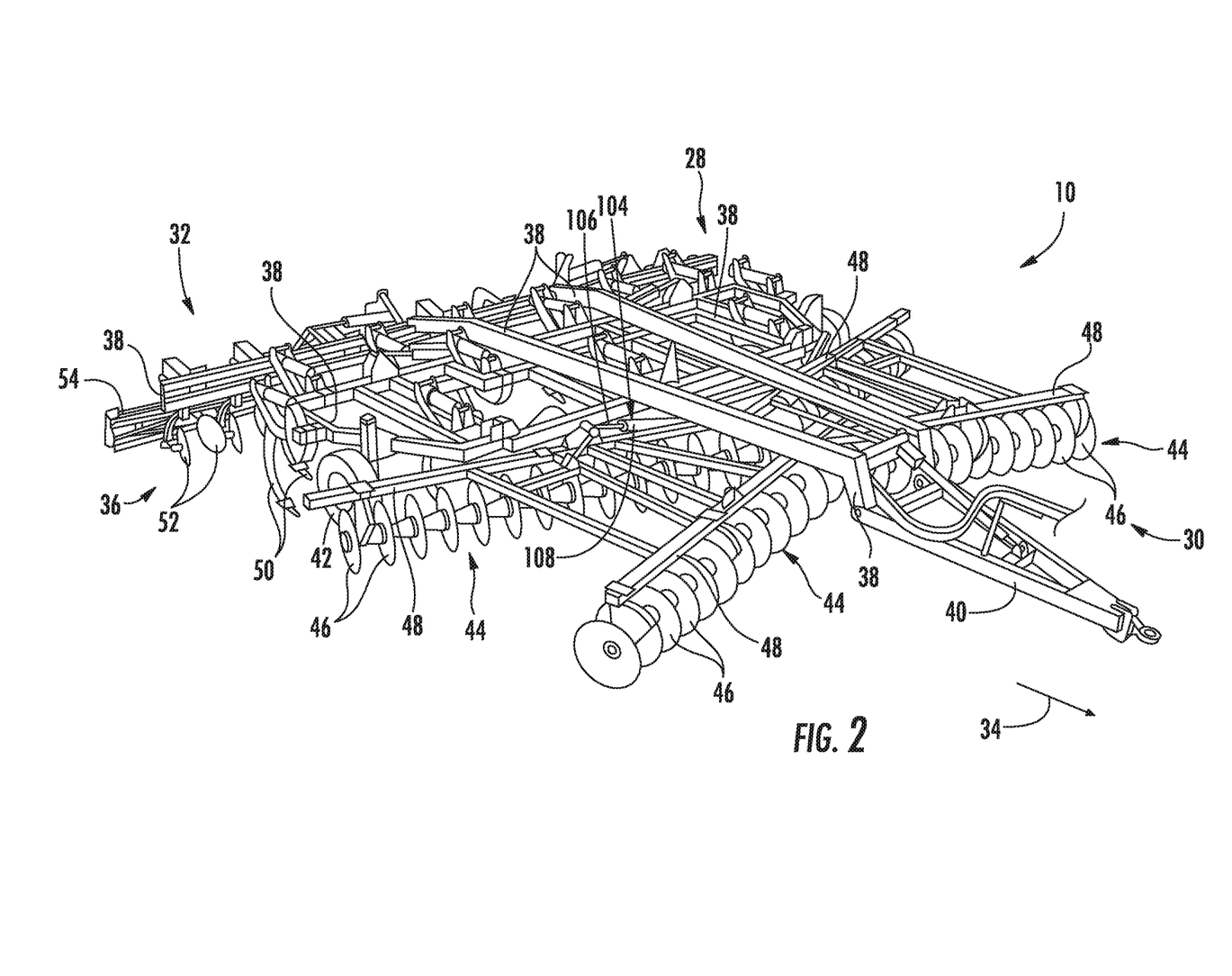
FIG. 2 illustrates an alternative perspective view of the tillage implement in accordance with aspects of the present subject matter, particularly illustrating various components of the implement.

Referring now to the drawings. FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, one or more ground engaging tools may be coupled to and/or supported by the frame 28. In such embodiments, the ground engaging tool(s) may, for example, include one or more ground-penetrating tools. More particularly, in certain embodiments, the ground engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported on the frame 28 at a location forward of the shanks 50, such as by including two forward disc gang assemblies 44 and two rear disc gang assemblies 44 positioned adjacent to the forward end 30 of the implement 10. However, it should be appreciated that, in alternative embodiments, the implement 10 may include any other suitable number of disc gang assemblies 44, such as more or fewer than four disc gang assemblies 44. Furthermore, in one embodiment, the disc gang assemblies 44 may be mounted to the frame 28 at any other suitable location, such as adjacent to its aft end 32.

Moreover, in several embodiments, the implement 10 may include a plurality of disc gang actuators 104 (one is shown in FIG. 2), with each actuator 104 being configured to move or otherwise adjust the orientation or position of one of the disc gang assemblies 44 relative to the implement frame 28. For example, as shown in FIG. 2, a first end of each actuator 104 (e.g., a rod 106 of the actuator 104) may be coupled to a toolbar 48 of the corresponding disc gang assembly 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang assembly 44 relative to a lateral centerline (not shown) of the frame 28 and/or the penetration depth of the associated disc blades 46. Furthermore, the rod 106 of each actuator 104 may be configured to extend and/or retract relative to the corresponding cylinder 108 to adjust a downforce applied by the actuator(s) 104 to the disk gang assembly 44, and thus the disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

It should be appreciated that, in addition to the shanks 50 and the disc blades 46, the implement frame 28 may be configured to support any other suitable ground engaging tools. For instance, in the illustrated embodiment, the frame 28 is also configured to support a plurality of leveling blades 52 and rolling (or crumbler) basket assemblies 54. In other embodiments, any other suitable ground engaging tools may be coupled to and supported by the implement frame 28, such as a plurality closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
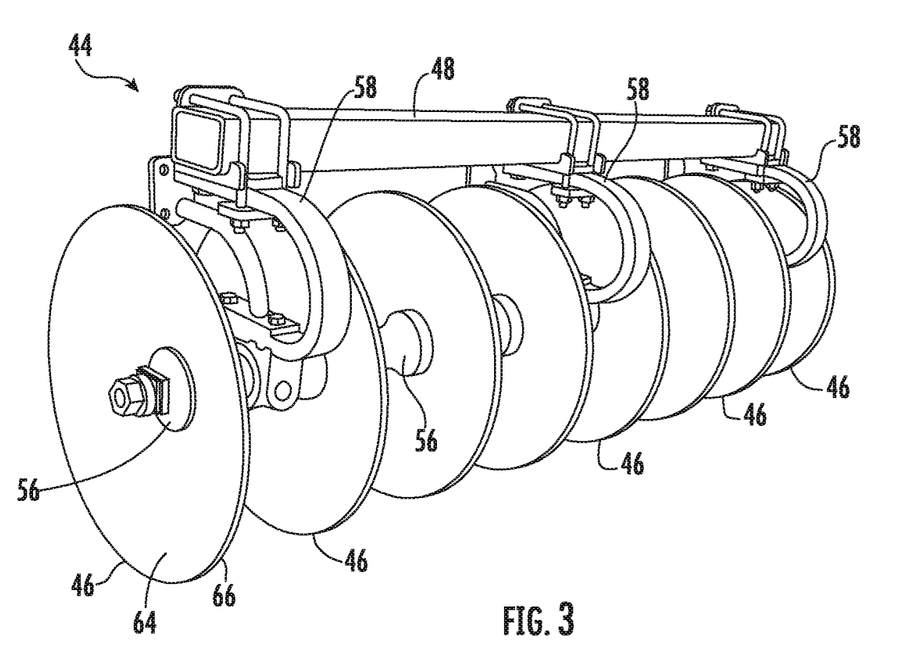
FIG. 3 illustrates a perspective view of a ganged tool assembly of the implement in accordance with aspects of the present subject matter, particularly illustrating the ganged tool assembly configured as a disc gang assembly of the tillage implement.

Referring now to FIG. 3, one example implementation of a ganged tool assembly described above in reference to FIGS. 1 and 2 is illustrated in accordance with aspects of the present subject matter. Specifically, FIG. 3 illustrates a perspective view of various components of the disc gang assemblies 44 of the implement 10 described above with reference to FIGS. 1 and 2. However, it should be appreciated that the aspects of ganged tool assembly described herein with reference to FIG. 3 may also be utilized with any other ganged tool assembly including any other suitable ground engaging tools of a given agricultural implement 10.

As shown in FIG. 3, the disc gang assembly 44 may include a plurality of disc blades 46 rotatably coupled to and spaced apart along the length of a disc gang shaft 56. The disc gang shaft 56 may, in turn, be positioned underneath and coupled to the toolbar 48 of the disc gang assembly 44 via one or more hangers 58 of the disc gang assembly 44. For example, in the illustrated embodiment, the hangers 58 define a C-shape that permits the disc gang shaft 56 and the disc blades 46 mounted thereon to move relative to the toolbar 48. However, it should be appreciated that, in alternative embodiments, the hanger(s) 58 may have any other suitable configuration.

Each of the disc blades 46 may include a concave side 64 and a convex side 66 opposite the concave side 64. The concave side 64 may generally be configured to penetrate and lift or throw the soil of the field. The convex side 66 is generally configured to reduce a back pressure or force on the convex side 66 of the disc blade 46. Generally the disc gang assembly 44 includes disc blades 46 with concave sides 64 oriented in the same direction such that the lifted soil is thrown in the same direction. For example, as also shown in FIG. 2, the disc blades 46 of the disc gang assembly 44 at the forward end 30 and first side 34 of the implement 10 may each generally lift and throw the soil outward towards the first side 34. Similarly, the disc blades 46 of the disc gang assembly 44 at the forward end 30 and second side 36 of the implement 10 may each generally lift and throw the soil outward towards the second side 36.

It is generally desirable that the disc blades 46 of the disc gang assemblies 44 at the aft end 32 of the implement be arranged to lift and throw the soil in the opposite direction than the disc gang assemblies 44 at the forward end 30. For instance, the disc blades 46 of the disc gang assembly 44 at the aft end 32 and first side 34 of the implement 10 may each generally lift and throw the soil inward towards the second side 36. Similarly, the disc blades 46 of the disc gang assembly 44 at the aft end 32 and second side 36 of the implement 10 may each generally lift and throw the soil inward towards the first side 34. Such an arrangement may generally avoid or reduce vallies and mounds formed behind the implement 10 as implement 10 is towed across the field. Moreover, the amount of soil thrown by the disc blades 46 may generally be modified by altering a depth of penetration of the disc blades 46. It should be appreciated that other configuration of the disc blades 46 may be suitable and equally applicable to the present disclosure. For instance, the disc blades 46 at the forward end 30 of the implement 10 may lift and throw the soil inward while the disc blades 46 at the aft end 32 may lift and throw the soil back outward.

Figure 4:
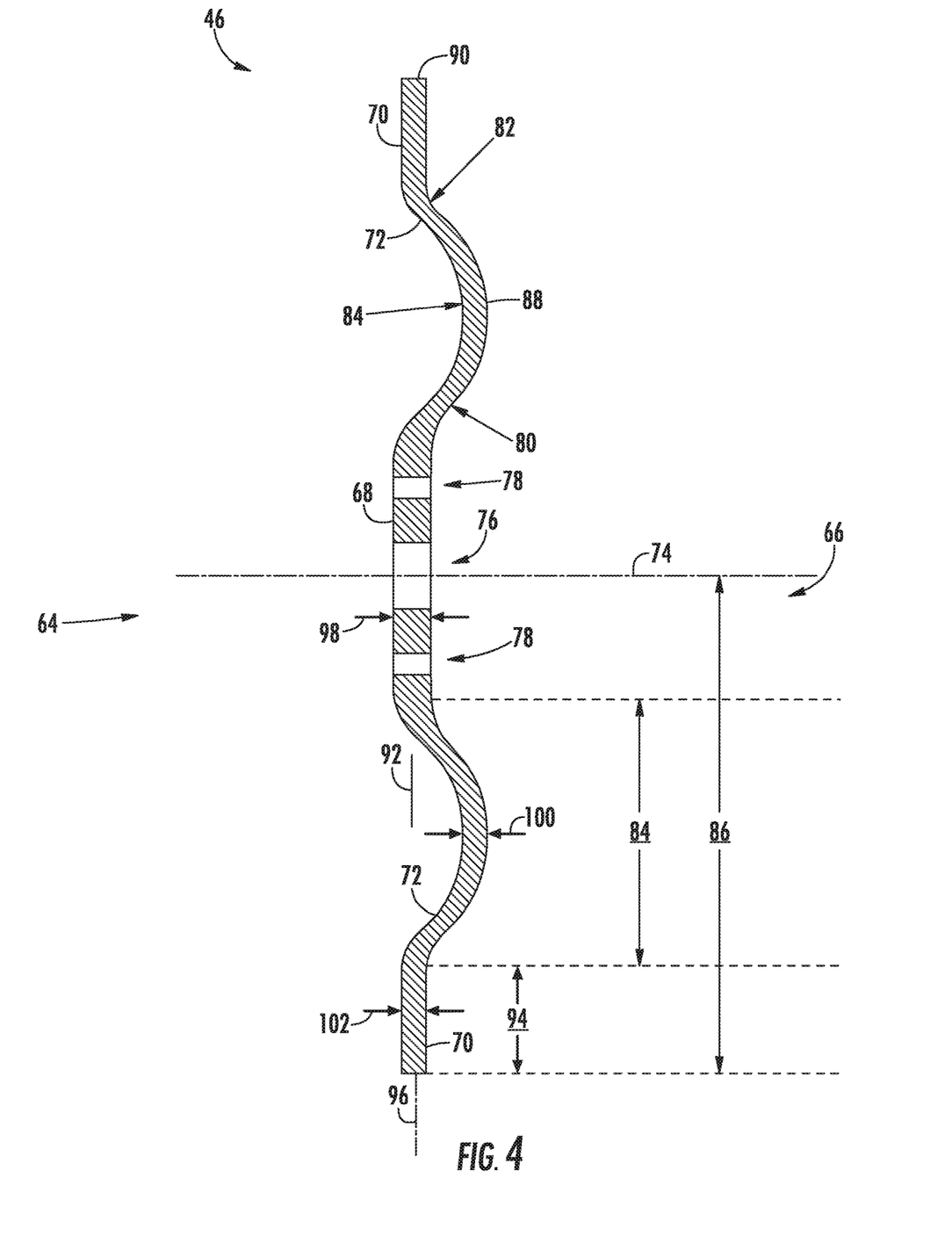
FIG. 4 illustrates a cross-sectional view of an exemplary cultivating disc in accordance with aspects of the present subject matter particularly illustrating the cultivating disc configured as a disc blade including a curved connecting portion and a straight cutting edge portion.

Referring now to FIG. 4, an exemplary embodiment of a cultivating disc for use with an agricultural implement is illustrated in accordance with aspects of the present subject matter. For instance, the cultivating disc of FIG. 4 may generally be utilized with the tillage implement 10 of FIGS. 1 and 2 and the ganged disc assembly 44 of FIGS. 1-3. Specifically, FIG. 4 illustrates a cross-sectional view of the cultivating disc configured as the disc blade 46 of the implement 10 as described above with reference to FIGS. 1-3. However, it should be appreciated that aspects of the cultivating disc described herein with reference to FIG. 4 may be utilized with other embodiments of a disc of a given agricultural implement, such as, but not limited to, leveling blades 52, opening discs, closing discs, and/or residue removal discs.

As shown in FIG. 4, the disc blade 46 may include an attachment portion 68 configured to be rotatably coupled to the frame 28 of the implement 10. The disc blade 46 may further include a cutting edge portion 70 configured to penetrate the soil to be cultivated in order to break up any residue within the field as well as break up the soil to be cultivated. The disc blade 46 may further include a curved connecting portion 72 extending radially between the attachment portion 68 and the cutting edge portion 70 relative to an axis of rotation 74 of the disc blade 46. The disc blade of 46 may generally provide a straight cutting edge portion 70 that allows the disc blade 46 to penetrate the soil with minimal or no disc blade back pressure and/or backside blade compaction. For instance, a straight cutting edge portion 70 or a cutting edge portion that extends along a plane perpendicular to the axis of rotation 74 may generally reduce an area of the cutting edge portion 70 on the convex side 66 of the disc blade 46 that contacts the soil.

Generally, a disc blade 46 that includes a curvature on the convex side 66 that extends to a ground penetrating portion of the disc blade 46 will increase the surface area of the disc blade 46 contacting the soil on the convex side 46. Such an increased surface area may be associated with several disadvantages, such as increasing a force on the disc blade 46 counter to the weight of the disc blade 46 and associated attachment components. Further, the increased surface area may require that a larger downforce be applied to the disc blade 46 in order to penetrate the soil to the desired depth. As such, a ground penetrating portion with such curvature may generally increase the wear on the disc blade 46, associated attachment components, and any downforce actuators associated with the disc blade 46. Additionally, the increased surface area contacting the soil on the convex side 66 of the disc blade 46 may also increase the compaction of the soil due to the weight of the disc blade 46 and downforce applied thereto. Greater compaction of the soil is generally less desirable as it decreases the efficiency of the cultivation procedure and has a negative impact on the agronomic conditions of the field.

Further, the curved connection portion 72 of the disc blade 46 may allow for the benefits of a curved disc blade 46 without the disadvantages associated with a curved cutting edge portion 70. For instance, the concave side 64 of the curved connecting portion 72 may generally allow the disc blade 46 to lift and throw soil and residue broken up by the cutting edge portion 70. Furthermore, the curved connecting portion 72 may generally increase the strength of the disc blade 46. Generally, a straight or approximately straight disc blade 46 may allow for the benefits of a straight cutting edge portion 70 but be associated with reduced strength and no or minimal lifting and throwing of the soil, especially at slight and zero camber angles 112 (see FIG. 6). As such, the disc blade 46 of FIG. 4 may generally receive the benefits of a straight cutting edge portion 70 as well as the benefits of a curved disc blade via the curved connection portion 72.

Still referring to the embodiment of FIG. 4, the attachment portion 68 may be positioned at a radial center of the disc blade 46 relative to the axis of rotation 74 of the disc blade 46. Additionally, the attachment portion 68 may extend along a first plane 92 perpendicular to the axis of rotation 74. The attachment portion 68 may include one or more attachment features configured to couple the disc blade 46 to the tillage implement 10 about the axis of rotation 74. For example, the disc blade 46 may include a central bore 76 configured to receive the disc gang shaft 56 (FIG. 3). The attachment portion 68 may further include one or more fastening bores 78 to couple the disc blade 46 to the disc gang shaft 56 in order to prevent relative rotation between the disc blade 46 and the disc gang shaft 56. For example, the fastening bore(s) 78 may receive associated fastener(s) such as bolts, screws, rivets, or the like to prevent a rotation of the disc blade 46 relative to the disc gang shaft 56.

While one embodiment of attachment features of the attachment portion 68 are described in reference to FIG. 4, it should be appreciated that other configurations of attachment feature(s) to rotationally couple the disc blade 46 to the tillage implement may occur to one of ordinary skill in the art. Further, though described as coupled to disc gang shaft 56, the disc blade 46 may be rotationally coupled to the implement 10 utilizing any other suitable structure as either a ganged assembly or individually to the frame 28 (FIG. 2) of the implement 10. For instance, the attachment feature(s) may include separate components placed on the disc gang shaft 56 on the concave side 64 and/or the convex side 66 in order to secure the disc blade 56. Furthermore, during operation, the attachment portion 68 may be entirely or approximately entirely covered by the disc gang shaft 56 and/or the attachment feature(s).

The curved connecting portion 72 may extend between the attachment portion 68 and the cutting edge portion 70. Furthermore, the curved connecting portion 72 may define a radial length 84 relative to the axis of rotation 74. In one exemplary embodiment, the radial length 84 of the curved connecting portion 72 may extend between 25% and 50% of a radial length 86 of the disc blade 46 relative to the axis of rotation 74 of the disc blade 46. The curved connecting portion 72 may define one or more radii of curvature (e.g., first radius of curvature 80, second radius of curvature 82, and third radius of curvature 84). For example, the first radius of curvature 80 may transition the curved connecting portion 72 to the attachment portion 86. Additionally, a second radius of curvature 82 may transition the curved connecting portion 72 to the cutting edge portion 70. Furthermore, a middle portion 88 between the first radius of curvature 80 and the second radius of curvature 82 of the curved connecting portion 72 may define a third radius of curvature 84. In the illustrated embodiment of FIG. 4, the third radius of curvature 84 is greater than the first and second radii of curvature 80, 82. Additionally, or alternatively, the arc of the middle portion 88 may extend along a greater percentage of the radial length 84 of the curved connecting portion 88 as compared to the arcs associated with the first and second radii of curvature 80, 82.

The concave side 64 of the disc blade 46 may generally be defined by the arc of the curved connecting portion 88 with the greatest radius and/or the arc of the curved connecting portion 88 extending along the greatest percentage of the radial length 84 of the disc blade 46. For instance, in the embodiment of FIG. 4, the concave side 64 of the disc blade 46 may be defined on the concave side of the arc defining the third radius 84. In other embodiment, it should be appreciated that the curved connecting portion 88 may define more than three radii of curvature. In still further embodiments, the curved connecting portion 88 may define only one radius of curvature (e.g., the largest radius of curvature 84) or two radii of curvature (e.g., the largest radius of curvature 84 and one of the other radii of curvature 80, 82). In such an embodiment, the curved connecting portion 88 may transition to the attachment portion 68 and/or the cutting edge portion 70 at one or more edges.

Still referring to the exemplary embodiment of FIG. 4, the cutting edge portion 70 may be positioned at a distal end 90 of the disc blade 46 relative to the axis of rotation 74. The cutting edge portion may define a radial length 94 relative to the axis of rotation 74 extending from the distal end 90 of the disc blade 46. In one exemplary embodiment, the radial length 94 of the cutting edge portion 70 may extend between 10% and 25% of the radial length 86 of the disc blade 46. Further, the cutting edge portion 70 may extend along a second plane 96 perpendicular to the axis of rotation 74. Moreover, one or both of the concave side 64 or the convex side 66 of the cutting edge portion 70 may extend along the second plane 96. For instance, in the embodiment of FIG. 4 both the concave side 64 and the convex side 66 of the cutting edge portion 70 extend along the second plane 96.

As further illustrated in reference to FIG. 4, the first plane 92 and the second plane 96 may be aligned or substantially aligned along the axis of rotation 74. For example, the first radius of curvature 80 and the second radius of curvature 82 and/or the lengths of the associated arcs may be equal or approximately equal. As such, the curved connecting portion 72 may extend at least partially along the axis of rotation 74 toward the convex side 66 of the disc blade 46 and return to approximately the same location along the axis of rotation 74 such that the planes 92, 96 are aligned.

Further, as shown, each of the attachment portion 68, the connecting portion 72, and the cutting edge portion 70 may define axial thicknesses (e.g., first thickness 98 of the attachment portion 68, second thickness 100 of the curved connecting portion 72, and third thickness 102 of the cutting edge portion 70). In one or more embodiments, the first thickness 98 may be greater than the second and third thicknesses 100, 102. As such, the thickest part of the disc blade 46 may be the attachment portion 68 in order to accommodate the loads acting on the disc blade 46. In a further embodiment, the second thickness 100 may similarly be greater than the third thickness 102. As such, the thickness of the disc blade 46 may decrease from the axis of rotation 74 to the distal end 90 of the disc blade 46. As an example, each of the attachment portion 68, the connecting portion 72, and the cutting edge portion 70 may define discrete thicknesses 98, 100, 102 along their entire radial lengths. In another embodiment, the thickness of the disc blade 46 may gradually reduce or taper toward the distil end 90 of the disc blade 46. For instance, the thickness 100 of the curved connecting portion 72 may gradually reduce from the attachment portion 68 to the cutting edge portion 70. Additionally, or alternatively, the thickness 102 of the cutting edge portion 70 may gradually reduce from the curved connecting portion 72 to the distal end 90 of the disc blade 46.

Figure 5:
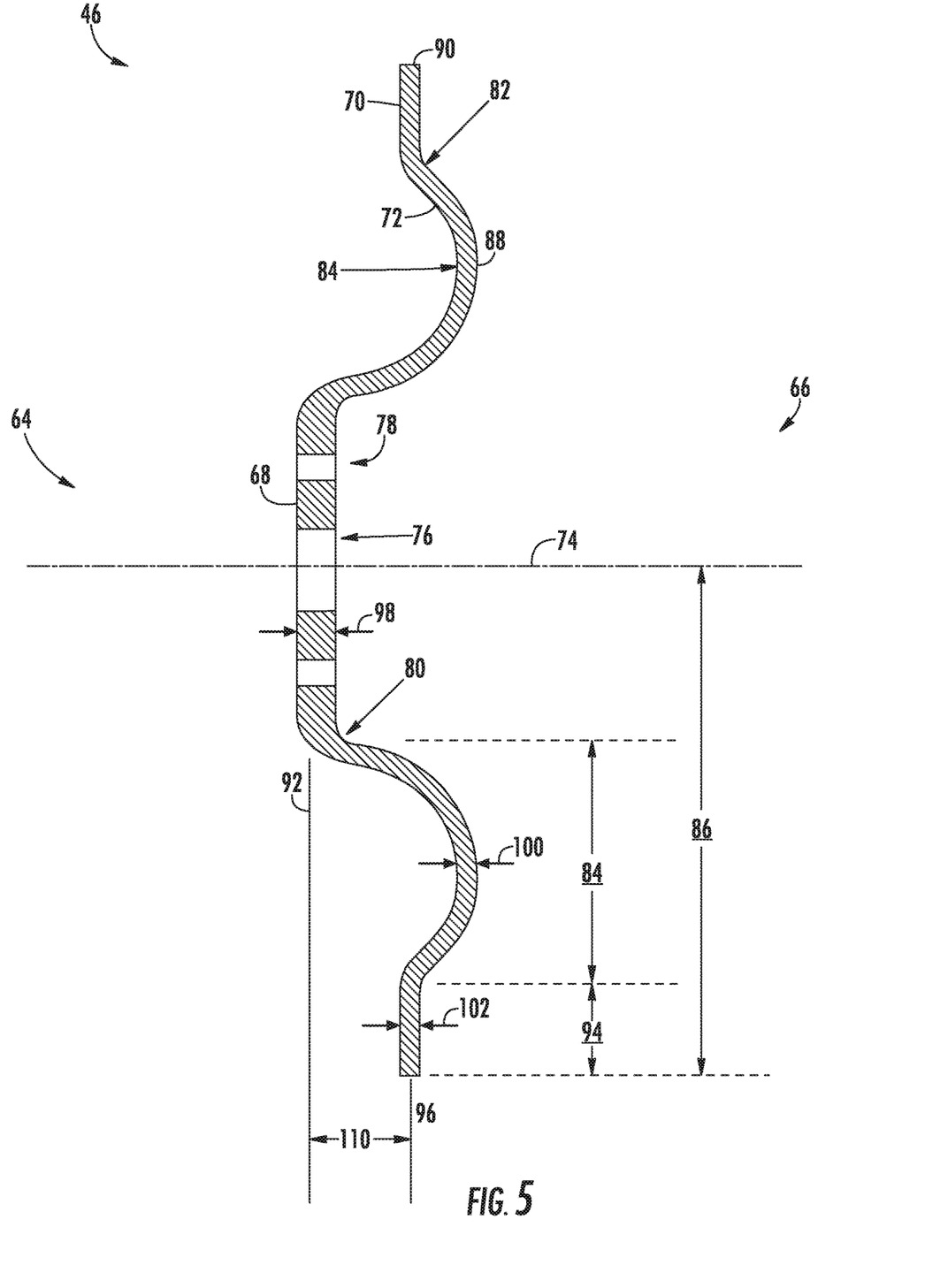
FIG. 5 illustrates a cross-sectional view of another exemplary cultivating disc in accordance with aspects of the present subject matter, particularly illustrating the cutting edge portion displaced from the attachment portion along an axis of rotation of the cultivating disc.

Referring now to FIG. 5, a cross-sectional view of an alternative exemplary embodiment the disc blade 46 is illustrated in accordance with aspects of the present subject matter. However, it should be appreciated that aspects of the disc blade 46 of FIG. 5 may generally be applicable to other configuration of a cultivating disc. Moreover, the disc blade 46 of FIG. 5 may generally be utilized with the tillage implement 10 of FIGS. 1 and 2 and the ganged disc assembly 44 of FIGS. 1-3. The disc blade 46 of FIG. 5 may generally be configured similarly to the disc blade 46 of FIG. 4. For instance, the disc blade 46 of FIG. 5 may include the attachment portion 68 extending along the first plane 92, the cutting edge portion 70 extending along the second plane 96, and the curved connecting portion 72 defining one or more radii of curvature 80, 82, 84. However, in the illustrated embodiment of FIG. 5, the cutting edge portion 70 may be displaced from the attachment portion 68 along the axis of rotation 74.

As shown in FIG. 5, the first plane 92 may be axially displaced from the second plane 96 relative to the axis of rotation 74 by an axial length 110. As such, the cutting edge portion 70 may also be displaced from the attachment portion 68 along the axis of rotation 74 by the axial length 110. For example, as shown, the second plane 96 may be displaced from the first plane 92 along the axis of rotation 74 toward the convex side 66 of the disc blade 46. For example, the second radius of curvature 82 may be smaller than the first radius of curvature 80 and/or the arc associated with the second radius of curvature 82 may be shorter than the arc associated with the first radius of curvature 80. As such, the segment of the curved connecting portion 72 associated with the first radius of curvature 80 may displace the disc blade 46 from the first plane 92 along the axis of rotation 74 more than the arc associated the second radius of curvature 82 displaces the disc blade 46 back toward the first plane 92. However, in other embodiments, the second plane 96 may be displaced from the first plane 92 along the axis of rotation 74 toward the concave side 64 of the disc blade 46. For example, the second radius of curvature 82 may be larger than the first radius of curvature 80 and/or the arc associated with the second radius of curvature 82 may be longer than the arc associated with the first radius of curvature 80.

Figure 6:
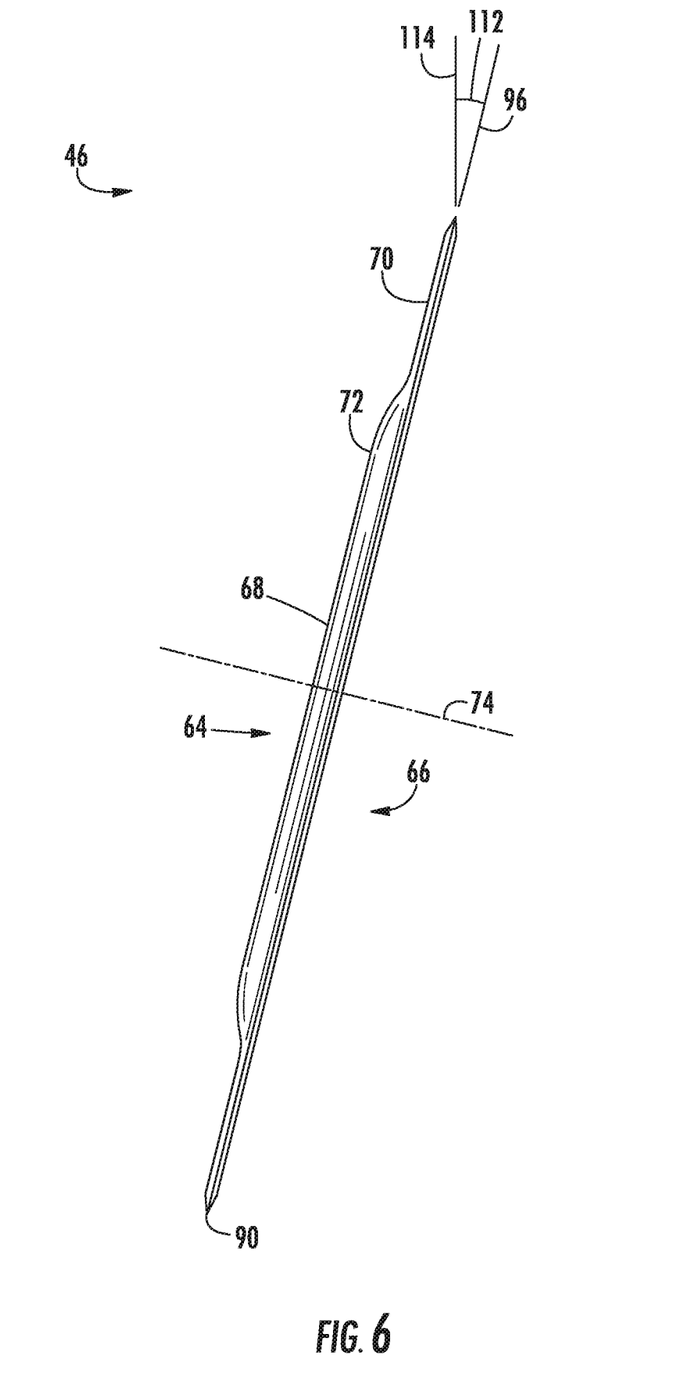
FIG. 6 illustrates a side view of an embodiment of the disc blade in accordance with aspects of the present subject matter, particularly illustrating the disc blade at a camber angle.

Referring now to FIG. 6, a side view of a cultivating disc is illustrated in accordance with aspects of the present disclosure. Particularly, FIG. 6 illustrates the cultivating disc configured at a camber angle. Moreover, the cultivating disc of FIG. 6 is configured as a disc blade 46 similar to the disc blades 46 of FIGS. 4 and 5. For instance, the disc blade 46 of FIG. 6 may include the attachment portion 68, the cutting edge portion 70 extending along the second plane 96, and the curved connecting portion 72. As shown the disc blade 46 may be oriented at a camber angle 112 defined between the first plane 96 and a line 114 normal to the surface of the field to be cultivated. For example, in the illustrated embodiment, the camber angle 112 may be defined toward the convex side 66 of the disc blade 46. The camber angle 112 may generally be adjusted or set by changing an angle the disc gang shaft 56 defines relative to the surface of the field to be cultivated. For instance the rod 106 and/or cylinder 108 of the gang disc actuator 104 (FIG. 2) may be displaced in order to adjust the camber angle 112. It should be appreciated that, in other embodiments, the disc blade 46 may be configured to be perpendicular or approximately perpendicular to the surface of the field such that the camber angle is zero or approximately zero.

Various embodiments of the disc blade 46 of the present disclosure may be particularly suitable to configurations of the disc blade 46 where the camber angle 112 is slight or approximately zero. For example, the cutting edge portion 70 extending along the second plane 96 may reduce or eliminate the surface area on the convex side 66 of the disc blade 46 that contacts the soil. More specifically, a cutting edge portion 70 with a convex surface on the convex side 66 of the disc blade 46 may generally contact more soil than the cutting edge 70 extending along the second plane 96. Thus, embodiments of the disc blade 46 disclosed herein may generally reduce soil compaction and disc blade backpressure, especially at slight camber angles 112 and perpendicular disc blades 46 relative to the surface of the field to be cultivated.

Figure 7:
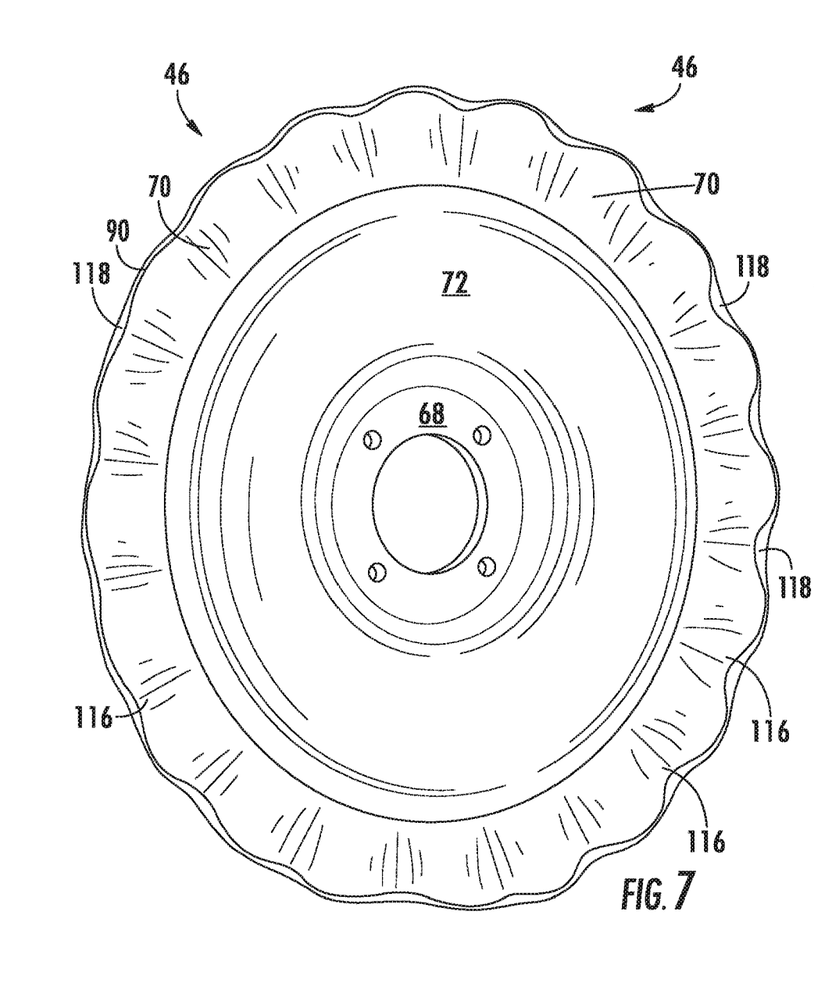
FIG. 7 illustrates a perspective view of another embodiment of the disc blade in accordance with aspects of the present subject matter, particularly illustrating a view of a concave side of the disc blade including bevels.
Figure 8:
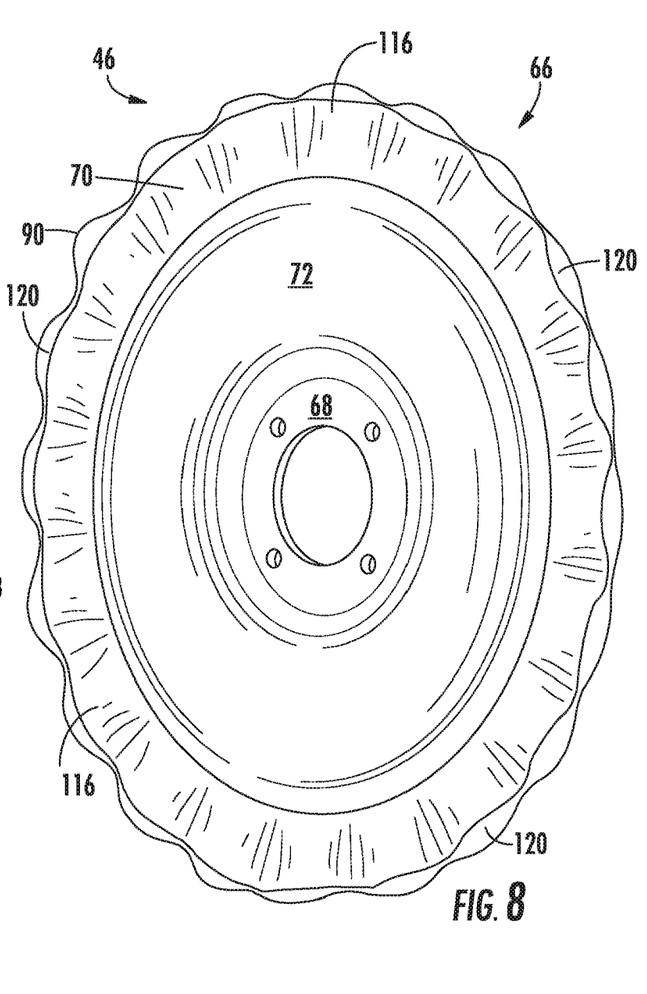
FIG. 8 illustrates another perspective view of the disc blade of FIG. 7 in accordance with aspects of the present subject matter, particularly illustrating a view of a convex side of the disc blade including bevels.

Referring now to FIGS. 7 and 8 multiple views of an embodiment of the disc blade 46 including cutting edge features configured to improve the amount of debris and soil cut and/or lifted by the disc blade 46 are illustrated in accordance with aspects. Particularly, FIG. 7 illustrates the concave side 64, and FIG. 8 illustrates the convex side 66 of a disc blade 46 including bevels 116. The disc blade 46 of FIGS. 7 and 8 may generally be configured similarly to the disc blades 46 of FIGS. 4 and 5. For instance, the disc blade 46 of FIGS. 7 and 8 may include the attachment portion 68 extending along the first plane 92, the cutting edge portion 70 extending along the second plane 96, and the curved connecting portion 72 defining one or more radii of curvature 80, 82, 84. However, the disc blade 46 of FIGS. 7 and 8 may include the bevels 116 generally configured to help cut debris within the field and as well as break up the soil of the field. Further, the bevels 116 may increase an amount of soil lifted and thrown by the disc blade 46. While the embodiment of FIGS. 7 and 8 illustrates bevels 116 on both the concave side 64 and the convex side 66 of the disc blade, it should be appreciated that, in other embodiments, the concave side 64 or convex side 66 may not include the bevels 116 such that the concave side 64 or convex side 66 of the cutting edge portion 70 extends along the second plane 96 (see e.g., FIGS. 4 and 5).

As illustrated in FIGS. 7 and 8, the bevels 116 may be formed on or within or be coupled to the convex side 64 and/or convex side 66 of the cutting edge portion 70 such that the bevels 116 circumferentially inscribe the disc blade 46. For example, material may be removed between bevels 116 within the cutting edge portion 70 or the cutting edge portion 70 may be formed with such bevels 116 in a casting or additive manufacturing procedure. In still other embodiments, bevels 116 may be attached to the cutting edge portion 70. As shown, the edges between bevels 116 may be filleted. Referring particularly to FIG. 7, the cutting edge portion 70 may be include a chamfer 118 on the concave side 64 of the cutting edge portion 70 such that the thickness 102 (FIGS. 4 and 5) of the cutting edge portion 70 tapers along at least a portion of its radial length 94 toward the distal end 90 of the disc blade 46. Referring particularly to FIG. 8, the cutting edge portion 70 may be include a number of fillets 120, such as a fillet 120 for each bevel 116, on the convex side 66 of the cutting edge portion 70. As such, the bevels 116 on the convex side 66 of the cutting edge portion 70 may gradually decreases the thickness 102 of the cutting edge portion 70 along at least a portion of its radial length 94 toward the distal end 90 of the disc blade 46.

Figure 9:
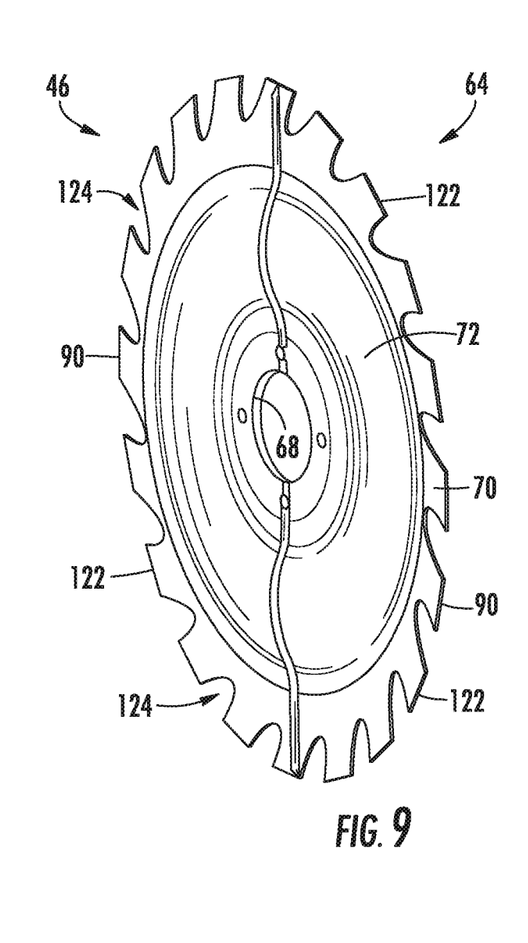
FIG. 9 illustrates a perspective view of another embodiment of the disc blade in accordance with aspects of the present subject matter, particularly illustrating a view of the concave side of the disc blade including teeth.
Figure 10:
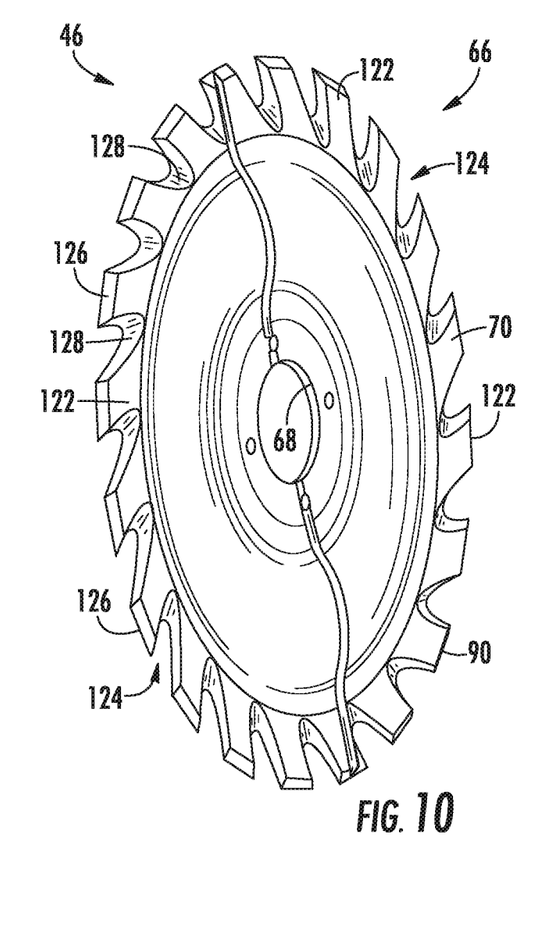
FIG. 10 illustrates another perspective view of the disc blade of FIG. 9 in accordance with aspects of the present subject matter, particularly illustrating a view of the convex side of the disc blade including teeth.

Referring now to FIGS. 9 and 10 multiple views of another embodiment of the disc blade 46 including cutting edge features configured to improve the amount of debris and soil cut by the disc blade 46 are illustrated in accordance with aspects of the present subject matter. Particularly, FIG. 9 illustrates the concave side 64, and FIG. 10 illustrates the convex side 66 of an embodiment of the disc blade 46 including teeth 122. The disc blade 46 of FIGS. 9 and 10 may generally be configured similarly to the disc blades 46 of FIGS. 4 and 5. For instance, the disc blade 46 of FIGS. 9 and 10 may include the attachment portion 68 extending along the first plane 92, the cutting edge portion 70 extending along the second plane 96, and the curved connecting portion 72 defining one or more radii of curvature 80, 82, 84. However, the disc blade 46 of FIGS. 9 and 10 may include the teeth 122 generally configured to help cut debris within the field as well as break up the soil of the field. As shown, the teeth 122 may be formed on or within or be coupled to the cutting edge portion 70 at the distal end 90 of the disc blade 46. For example, the teeth 122 may circumferentially inscribe the disc blade 46. For instance, material may be removed at the distal end 90 of the cutting edge portion 70 in order to form recesses 124 between the teeth 122. Alternatively, the teeth 122 may be formed within the cutting edge portion 70 of the disc blade 46 during a casting or additive manufacturing procedure. As a further example, teeth 122 may be attached to the distal end 90 of the cutting edge portion 70.

Referring particularly to FIG. 10, the cutting edge portion 70 may include a plurality of chamfers 126, such as chamfer 126 for each tooth 122, on the convex side 66 of the cutting edge portion 70 such that the thickness 102 (FIGS. 4 and 5) of the cutting edge portion 70 tapers along at least a portion of its radial length 94 toward the distal end 90 of the disc blade 46. As further illustrated in FIG. 10, the cutting edge portion may include a plurality of chamfers 128, such as a chamfer 128 for each recess 124, on the convex side 66 of the cutting edge portion such that the thickness 102 of the cutting edge portion 70 tapers along at least a portion of its radial length 94 toward the distal end 90 of the disc blade 46.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A cultivating disc for a tillage implement, the cultivating disc comprising:
    an attachment portion positioned at a radial center of the cultivating disc, the attachment portion including at least one attachment feature configured to couple the cultivating disc to the tillage implement about an axis of rotation of the cultivating disc, wherein the attachment portion extends along a first plane perpendicular to the axis of rotation of the cultivating disc;
    a cutting edge portion positioned at a distal end of the cultivating disc relative to the axis of rotation; and
    a curved connecting portion positioned between and connecting the attachment portion to the cutting edge portion, the curved connecting portion having a concave side and a convex side, the curved connecting portion defining at least one radius of curvature,
    wherein the cultivating disc extends along the axis of rotation between a first side and a second side, the first side including the concave side of the curved connecting portion, the second side including the convex side of the curved connecting portion, and
    wherein the cutting edge portion extends along a second plane parallel to the first plane, with a surface of the cutting edge portion positioned on the second side of the cultivating disc being parallel to the second plane, the surface of the cutting edge portion positioned on the second side of the cultivating disc extending radially inwardly from the distal end of the cultivating disc towards the curved connecting portion.

2. The cultivating disc of claim 1, wherein the concave side of the curved connecting portion is closer to the second plane than the convex side of the curved connecting portion.

3. The cultivating disc of claim 2, wherein at least one of the surface of the cutting edge portion positioned on the first side of the cultivating disc or the surface of the cutting edge portion positioned on the second side of the cultivating disc includes a plurality of bevels circumferentially spaced around the cultivating disc.

4. The cultivating disc of claim 2, wherein the cutting edge portion includes a plurality of teeth at the distal end of the cultivating disc circumferentially spaced around the cultivating disc.

5. The cultivating disc of claim 1, wherein a surface of the cutting edge portion positioned on the first side of the cultivating disc is parallel to the second plane.

6. The cultivating disc of claim 1, wherein the curved connecting portion further defines a plurality of radii of curvature.

7. The cultivating disc of claim 6, wherein the plurality of radii of curvature include a first radius of curvature transitioning the curved connecting portion to the attachment portion, a second radius of curvature transitioning the curved connecting portion to the cutting edge portion, and a third radius of curvature of a middle portion between the first and second radii of curvature.

8. The cultivating disc of claim 7, wherein the third radius of curvature is greater than the first and second radii of curvature.

9. The cultivating disc of claim 7, wherein the first radius of curvature is equal or substantially equal to the second radius of curvature.

10. The cultivating disc of claim 7, wherein the second radius of curvature is smaller than the first radius of curvature.

11. The cultivating disc of claim 1, wherein the first plane is aligned or substantially aligned with the second plane along the axis of rotation.

12. The cultivating disc of claim 1, wherein the second plane is displaced from the first plane along the axis of rotation.

13. The cultivating disc of claim 1, wherein the attachment portion defines a first thickness, the curved connecting portion defines a second thickness, and the cutting edge portion defines a third thickness, and wherein the first thickness is greater than the second thickness and the third thickness.

14. The cultivating disc of claim 1, wherein the cutting edge portion defines a radial length between 10% and 25% of a length of a radius of the cultivating disc, and the curved connecting portion defines a radial length between 25% and 50% of the length of the radius of the cultivating disc.

15. A tillage implement, comprising:
a frame;
a plurality of ground engaging tools coupled to the frame, at least one of the ground engaging tools configured as a cultivating disc, the at least one cultivating disc comprising:
an attachment portion positioned at a radial center of the cultivating disc, the attachment portion including at least one attachment feature configured to couple the cultivating disc to the frame of the tillage implement about an axis of rotation of the cultivating disc, wherein the attachment portion extends along a first plane perpendicular to the axis of rotation of the cultivating disc;
a cutting edge portion positioned at a distal end of the cultivating disc relative to the axis of rotation; and
a curved connecting portion positioned between and connecting the attachment portion to the cutting edge portion, the curved connecting portion having a concave side and a convex side, the curved connecting portion defining at least one radius of curvature,
wherein the cultivating disc extends along the axis of rotation between a first side and a second side, the first side including the concave side of the curved connecting portion, the second side including the convex side of the curved connecting portion, and
wherein the cutting edge portion extends along a second plane parallel to the first plane, with a surface of the cutting edge portion positioned on the second side of the cultivating disc being parallel to the second plane, the surface of the cutting edge portion positioned on the second side of the cultivating disc extending radially inwardly from the distal end of the cultivating disc towards the curved connecting portion.

16. The tillage implement of claim 15, wherein the concave side of the curved connecting portion is closer to the second plane than the convex side of the curved connecting portion.

17. The tillage implement of claim 15, wherein a surface of the cutting edge portion positioned on the first side of the cultivating disc is parallel to the second plane.

18. The tillage implement of claim 15, wherein the cutting edge portion defines a radial length between 10% and 25% of a length of a radius of the cultivating disc, and the curved connecting portion defines a radial length between 25% and 50% of the length of the radius of the cultivating disc.

19. The tillage implement of claim 15, wherein the at least one cultivating disc is configured to be oriented relative to a soil surface at a camber angle of 5 degrees or less.

20. The tillage implement of claim 15, wherein the at least one cultivating disc is configured to be perpendicular relative to a soil surface.

* * * * *